US012229216B2

(12) United States Patent
Weintraub et al.

(10) Patent No.: US 12,229,216 B2
(45) Date of Patent: Feb. 18, 2025

(54) KINEMATIC INVARIANT-SPACE MAXIMUM ENTROPY TRACKER (KISMET)

(71) Applicant: Reservoir Labs, Inc., New York, NY (US)

(72) Inventors: Lawrence Craig Weintraub, West Orange, NJ (US); Matthew Harper Langston, Beacon, NY (US); Julia Wei, Berkeley, CA (US); Richard Lethin, New York, NY (US); Aimee Kristine Nogoy, Boston, MA (US); Mitchell Harris, Sommerville, MA (US); Paul Mountcastle, Shelton, CT (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/693,112

(22) Filed: Mar. 11, 2022

(65) Prior Publication Data

US 2024/0104167 A1    Mar. 28, 2024

Related U.S. Application Data

(60) Provisional application No. 63/187,214, filed on May 11, 2021.

(51) Int. Cl.
*G06F 18/10* (2023.01)
*G06F 17/18* (2006.01)
(Continued)

(52) U.S. Cl.
CPC .............. *G06F 18/10* (2023.01); *G06F 17/18* (2013.01); *G06F 18/2155* (2023.01);
(Continued)

(58) Field of Classification Search
None
See application file for complete search history.

(56) References Cited

U.S. PATENT DOCUMENTS

| 11,858,536 | B1 * | 1/2024 | Liu | ....................... G06N 3/0464 |
| 2005/0001759 | A1 * | 1/2005 | Khosla | ................... G01S 13/726 |
| | | | | 342/195 |

(Continued)

FOREIGN PATENT DOCUMENTS

CN          108519595 A    *    9/2018

OTHER PUBLICATIONS

Han et al., "An Algorithm for Multiple Object Trajectory Tracking" Proceedings of the 2004 IEEE Computer Society Conference on Computer Vision and Pattern Recognition (CVPR'04) (Year: 2004).*
Svensson et al., "Target tracking based on estimation of sets of trajectories" 17th International Conference on Information Fusion, Fusion 2014 (Year: 2014).*
Julier S.J., "The Scaled Unscented Transformation", Proceedings of the American Control Conference Anchorage, AK May 8-10, 2002, pp. 4555-4559.

(Continued)

*Primary Examiner* — John C Kuan
(74) *Attorney, Agent, or Firm* — Seyfarth Shaw LLP

(57) ABSTRACT

A processor-implemented method for simultaneously tracking one or more objects includes receiving, via a dynamical system with a set of sensors, a first set of unlabeled measurements from one or more objects. Each of the measurements is a function of time. A set of candidate tracks is determined for the one or more objects. Probabilities of each of the first set of unlabeled measurements being assigned to each of the set of candidate tracks are computed. A track from the set of candidate tracks is determined for each of the one or more objects based on a joint probability distribution of track attributes and the probabilistic assignment of each of the first set of unlabeled measurements to each of the set of candidate tracks.

20 Claims, 7 Drawing Sheets

(51) Int. Cl.
G06F 18/214 (2023.01)
G06F 18/22 (2023.01)
G06F 18/232 (2023.01)
G06F 18/2325 (2023.01)

(52) U.S. Cl.
CPC ............ *G06F 18/22* (2023.01); *G06F 18/232* (2023.01); *G06F 18/2325* (2023.01); *G06F 2218/00* (2023.01)

(56) References Cited

U.S. PATENT DOCUMENTS

2018/0203446 A1* 7/2018 Wyffels ................. G01S 17/931
2019/0242988 A1* 8/2019 Turner .................. G01S 13/726
2020/0284896 A1* 9/2020 Henretty ............... G01S 13/723

OTHER PUBLICATIONS

Mackay D.J.C., "Information Theory, Inference and Learning Algorithms", 2003, 640 Pages.

Magri L., et al., "T-Linkage: a Continuous Relaxation of J-Linkage for Multi-Model Fitting", 2014 IEEE Conference on Computer Vision and Pattern Recognition, 2014, pp. 3954-3961.

More J.J., "The Levenberg-Marquardt Algorithm: Implementation and Theory", Conference on Numerical Analysis University of Dundee, Scotland Jun. 28-Jul. 1, 1977, 16 Pages.

Toldo R., et al., "Robust Multiple Structures Estimation with J-Linkage", 2008, pp. 535-547.

Vinti J.P., "Improvement of the Spheroidal Method for Artificial Satellites", The Astronomical Journal, vol. 74, No. 1, Feb. 1969, pp. 25-34.

* cited by examiner

Process 1: Approximate E-M (approx.-EM)

Initialize $\pi_k, \bar{u}_k, \Sigma_k$ using candidate track descriptions.
Set the previous log-likelihood $L_p = -$ inf, threshold `thr` and maximum number of iterations `max_iter`.
Set `iter` = 0.
While `iter < max_iter` do
    Translate the invariant space uncertainty into measurement errors $(\hat{\theta}_{nk})$ via the Unscented Transform (UT).
    Set $p(\theta_n|t_n, \sigma_n, z_n = k) = 0$ for disallowed values of $\omega_{nk}$ Compute the $w_{nk}$
    Compute the log-likelihood $L = \sum_n \sum_k P(\theta_n, \sigma_n|z_n = k)\pi_k$. (Eq. 8)
    If
      $|L - L_p| <$ `thr` then
      | break
    else
      | $L_p = L$
    end
    Sample $\hat{z}_n \sim$ Categorical $(w_n)$ for each $n$.
    for $k$ *in* $1:K$ do
      Let $S = \{n|\hat{z}_n = k\}$
      Solve non-linear least-squares problem
      $\tilde{\mu}_k = \arg\min_{\bar{\mu}_k} \sum_{s \in S}(\frac{1}{2}(\theta_s - \hat{\theta}_{sk})^T \sigma_s^{-2}(\theta_s - \hat{\theta}_{sk}))$ (Eq. 11)
      Compute $\tilde{\Sigma}_k = -H^{-1}(P)|_{\tilde{\mu}_k}$ via numerical differentiation. (Eq. 13)
      Set $\tilde{\Sigma}_k$ to its projection in the subspace of PSD matrices.
    end
    Set $\hat{\mu}_k = \tilde{\mu}_k, \Sigma_k = \tilde{\Sigma}_k$, and $\pi_k = \frac{1}{N}\sum_n \omega_{nk}$ (Eq. 15).
    Increment `iter`.
end

*FIG. 5*

KINEMATIC INVARIANT-SPACE MAXIMUM ENTROPY TRACKER (KISMET)

CROSS-REFERENCE TO RELATED APPLICATION

The present application claims the benefit of U.S. Provisional Patent Application No. 63/187,214, filed on May 11, 2021, and titled "KINEMATIC INVARIANT-SPACE MAXIMUM ENTROPY TRACKER (KISMET)," the disclosure of which is expressly incorporated by reference in its entirety.

STATEMENT OF GOVERNMENT SUPPORT

This invention was made with government support under Contract No. HQ0147-17-C-7422 and Contract No. HQ0147-19-C-7152 awarded by the Missile Defense Agency. The government has certain rights in the invention.

FIELD OF INVENTION

Aspects of the present disclosure generally relate to tracking of one or more objects.

BACKGROUND

In many situations such as automatic maneuvering of airborne objects, underwater objects, objects in outer space, autonomous motor vehicles, surveillance tasks, and mobile communications, the detection of objects and a target region is necessary, however, it is also necessary to track the movement of such objects. To this end, sensors or imaging devices such as high-resolution cameras, radar, lidar, and other sensor signals are processed to extract actionable knowledge, for example, detection of objects of interest, such as vehicles in the field, satellites launched into an orbit and the like. Actionable knowledge or other information of interest may also include determining whether and how an object may be moving, such as the speed and direction of a vehicle.

Often, a significant amount of data is collected from sensors and a large number of computations is performed on the the data to extract such useful actionable information. As such, many sensors and associated data processing systems are bulky and costly, and may generally consume a significant amount of power. Additionally, the number of objects included in the system may not be known, thus the correspondence between sensor observations and objects may not be known.

SUMMARY

The present disclosure is set forth in the independent claims, respectively. Some aspects of the disclosure are described in the dependent claims.

In an aspect of the present disclosure, a processor-implemented method for tracking objects is presented. The processor-implemented method includes receiving, from a dynamical system with a set of sensors, a first set of unlabeled measurements from one or more objects. Each of the first set of unlabeled measurements is a function of time. The processor-implemented method further includes determining a set of candidate tracks for the one or more objects. The processor-implemented method additionally includes computing probabilities of each of the first set of unlabeled measurements being assigned to each of the set of candidate tracks. The processor-implemented method further includes determining a track from the set of candidate tracks for each of the one or more objects based on a joint probability distribution of track attributes and the probabilistic assignment of each of the first set of unlabeled measurements to each of the set of candidate tracks.

Another aspect of the present disclosure is directed to an apparatus for tracking objects. The apparatus has a memory and one or more processors coupled to the memory. The processor(s) is configured to receive, from a dynamical system with a set of sensors, a first set of unlabeled measurements from one or more objects. Each of the first set of unlabeled measurements is a function of time. The processor(s) is also configured to determine a set of candidate tracks for the one or more objects. The processor(s) is additionally configured to compute probabilities of each of the first set of unlabeled measurements being assigned to each of the set of candidate tracks. The processor(s) is further configured to determine a track from the set of candidate tracks for each of the one or more objects based on a joint probability distribution of track attributes and the probabilistic assignment of each of the first set of unlabeled measurements to each of the set of candidate tracks.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 is a block of example pseudocode for an Expectation-Maximization (E-M) process, in accordance with aspects of the present disclosure.

DETAILED DESCRIPTION

Figure 1:
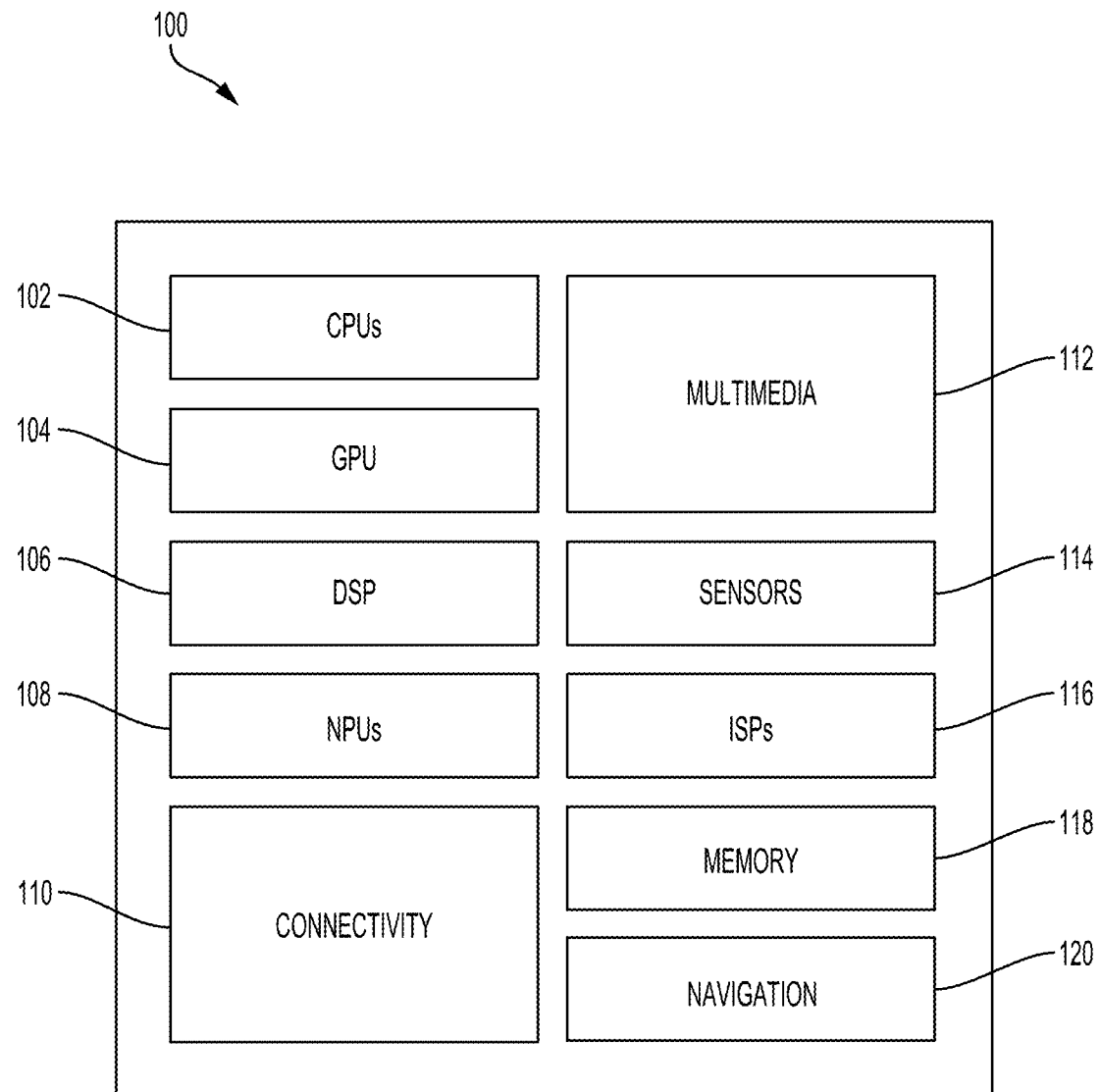
FIG. 1 illustrates an example system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Tracking objects in motion involves establishing the position of the object at a given time, and then updating the position based on information collected at later times. To accurately do so, the position determination should be informed by some understanding of the expected dynamics of the object during the intervening time period. An additional difficulty in the problem of tracking multiple objects in motion is that the individual observations may not have any identifying information to indicate which object is associated with a measurement. This means that in addition to identifying the dynamic characteristics of the objects, each measurement has to also be associated with the correct object, in order to eliminate errors in the estimation of the tracks of the objects.

To address these and other challenges, aspects of the present disclosure are directed to simultaneous tracking of multiple objects in motion. Aspects of the present disclosure take advantage of known ballistic properties of the object motion using a novel and efficient representation of Earth's gravitational motion, to use all data simultaneously for a holistic track formation, describing the complete motion of the objects under the time period of observation.

The problems of track formation and the association of measurements to tracks may be solved as two sides of a fully integrated optimization problem over a joint space of (1) kinematic attributes of tracks, and (2) measurement to track assignments. Unlike conventional trackers such as Extended Kalman Filters (EKF), Unscented Kalman Filters (UKF) and Multiple Hypothesis Trackers (MHT), in accordance with aspects of the present disclosure, these dual aspects of evolving target tracks are treated as features of a single joint probability distribution.

Additionally, the disclosed model, which may be referred to as Kinematic Invariant-Space Maximum Entropy Tracker (KISMET), may produce an output that describes the track of each object as a probability that the object's motion is described by a set of dynamic invariants. As such, aspects of the present disclosure may be broadly applicable to technologies such as autonomous vehicles, wireless communications, and surveillance, for example. Moreover, aspects of the present disclosure may also be applied to objects moving around other planetary bodies, as well as other extra-terrestrial motion.

KISMET may use invariants to describe the orbital path of the object. For example, in the case of fully ballistic objects, this includes six orbital parameters. For the case of non-ballistic objects, additional parameters can be used. By using orbital invariants, all calculations may take place independent of time, and the probability distributions describing the knowledge of various tracks is placed in the same space. This may simplify discrimination between different objects, because objects maintain constant separation between their orbital invariant descriptions, even if the orbits pass close to each other in physical space. In some aspects, basic Keplerian orbital parameters (e.g., energy, angular momentum, the Euler angles of the orbital plane, and the time reference of apogee) may be used. Alternatively, in some aspects, a six-parameter invariant description may be used to more accurately account for the oblate shape of the Earth. The Vinti solution may account for the J2, J3, and most of the J4 spherical harmonic terms of the Earth's geopotential, allowing accurate ballistic propagation. The six-parameter (e.g., six dimensional) invariant description of object dynamics may be referred to as dynamic invariants.

KISMET may also simultaneously identify the uncertainty in the track estimation, as well as the uncertainty in the association of measurements to tracks. Conventional trackers, as well as Multiple Hypothesis Trackers (MHTs), create a very large number of candidate tracks from a minimum size set of observations. In the case of angle-only measurements, this requires three measurements, resulting in $O(N^3)$ tracks created for N-observations for traditional MHTs. As more observations are made, this may become an overwhelming computational bottleneck. On the other hand, for KISMET, the candidate track numbers may be on the order of the number of objects, $K \ll N^3$. Each of the K tracks may be assigned a likelihood of association to each measurement, creating a task on the order $O(K*N)$, thus reducing the computational load relative to the conventional approaches.

Data-driven association between measurements and tracks may identify measurements that have ambiguous associations. Ambiguous associations may refer to measurements that are based on data that may be associated with more than one track. These measurements with ambiguous associations may be identified by the KISMET and deweighted intrinsically to improve the robustness to incorrectly associated measurements.

KISMET may simultaneously or concurrently track one or more objects without a priori knowledge of the number of tracks under observation. Instead, KISMET may determine the number of unique tracks from the data by finding which peaks in invariant-space are associated with a non-trivial number of measurements. Only those peaks represent true tracks, and the others may be discarded, determining the true number of tracks observed.

The simultaneous or concurrent solution of uncertainty in the track estimation and the association of measurements to tracks may enable the identification of tracks that begin or end in the middle of the observation period. If a track is associated almost entirely with measurements during a specific time-interval, while new tracks are associated with a period after the end of that interval, this may indicate the evolution of one object into two or more new objects, with new invariants describing their motion. This knowledge may further refine the solution by limiting the allowable associations based on the time of observation. Such knowledge may also be used to identify the genealogy of the observed objects and the physics of that evolution. In some aspects, such knowledge may further be applied to classify the individual objects.

Moreover, the physics observed may be employed to infer the existence of unobserved objects. The observed dynamics of observed objects, which have a common beginning time point or end time point, may indicate the existence of additional objects in order to satisfy physical conservation laws.

FIG. 1 illustrates an example implementation of a system-on-a-chip (SoC) 100, which may include a central processing unit (CPU) 102 or a multi-core CPU configured for simultaneously or concurrently tracking objects. Variables, system parameters associated with a computational device and other task information may be stored in a memory block associated with a processing unit such as a neural processing unit (NPU) 108, a CPU 102, a graphics processing unit (GPU) 104, a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SOC 100 may be based on an ARM instruction set. In aspects of the present disclosure, the instructions loaded into the general-purpose processor 102 may include code to receive, via a dynamical system with a set of sensors, a first set of unlabeled measurements from one or more objects. Each of the first set of unlabeled measurements is a function of time. The general-purpose processor 102 may also include code to determine a set of candidate tracks for the one or more objects. The general-purpose processor 102 may additionally include code to computing probabilities of each of the first set of unlabeled measurements being assigned to each of the set of candidate tracks. The general-purpose processor 102 may further include code to determine a track from the set of candidate tracks for each of the one or more objects based on a joint probability distribution of track attributes and the probabilistic assignment of each of the first set of unlabeled measurements to each of the set of candidate tracks.

The association between measurements and object tracks may be considered as a probabilistic question. That is, association may be determined by finding the probability that a particular measurement may be generated by a particular track. Each track, which may correspond to a path of on an object, has dynamics that may be described, for example, by six Vinti invariants (e.g., a six-dimensional vector, $\vec{q}_k$). Each invariant for each track is not a single value, but a value drawn from a distribution, because it is being estimated from measurements that may have some degree of uncertainty. The distributions may be represented explicitly or parametrically. For instance, the distributions describing the invariants may be represented as Gaussian, resulting in a Gaussian mixture model. As such, the mathematics may then become tractable for using the Expectation-Maximization (E-M) to find the mean, $\vec{\mu}_k$, and covariance $\Sigma_k$, for each Gaussian, and the probability, $\omega_{nk}$, for associating each measurement, $\theta_n$, with each potential or candidate track of an object in a manner consistent with the data.

The measurements, $\theta_n$, may be observed via a set of sensors (e.g., sensors 114 of FIG. 1) and may be any measurement that is a function of the object dynamics, as represented, for example, by the dynamic invariants $\vec{q}_k$, the time $t_n$, and the position of the sensor. In some examples, the measurements may include range, elevation, azimuth, and radial velocity. In some aspects, the measurements may be fused from multiple sensors, including sets of sensors that each provide a different set of measurement types. Measurement and time biases between the sensors may be included as additional parameters and fitted probabilistically. The sensors may be placed in any position, and may be static or in motion, including, for instance, ballistic/orbital motion of their own, such as in a satellite-based sensor.

One or more objects detected via the sensors may travel along K tracks. Each measurement $\theta_n$ at time $t_n$ may correspond to one of the K tracks. Given a set of discrete latent variables, $\{z_n\}_{n=1}^N$, where each $z_n$ has a value between 1 and K, representing the component k that measurement n is assigned to, where the component k is parameterized by the mean $\vec{\mu}_k$ and covariance $\Sigma_k$ of a normally distributed set of kinematic invariants. A mixing coefficient of component k may be referred to as its marginal probability, which is denoted by $\pi_k$, where $\Sigma_{k=1}^K \pi_k = 1$.

Figure 2:
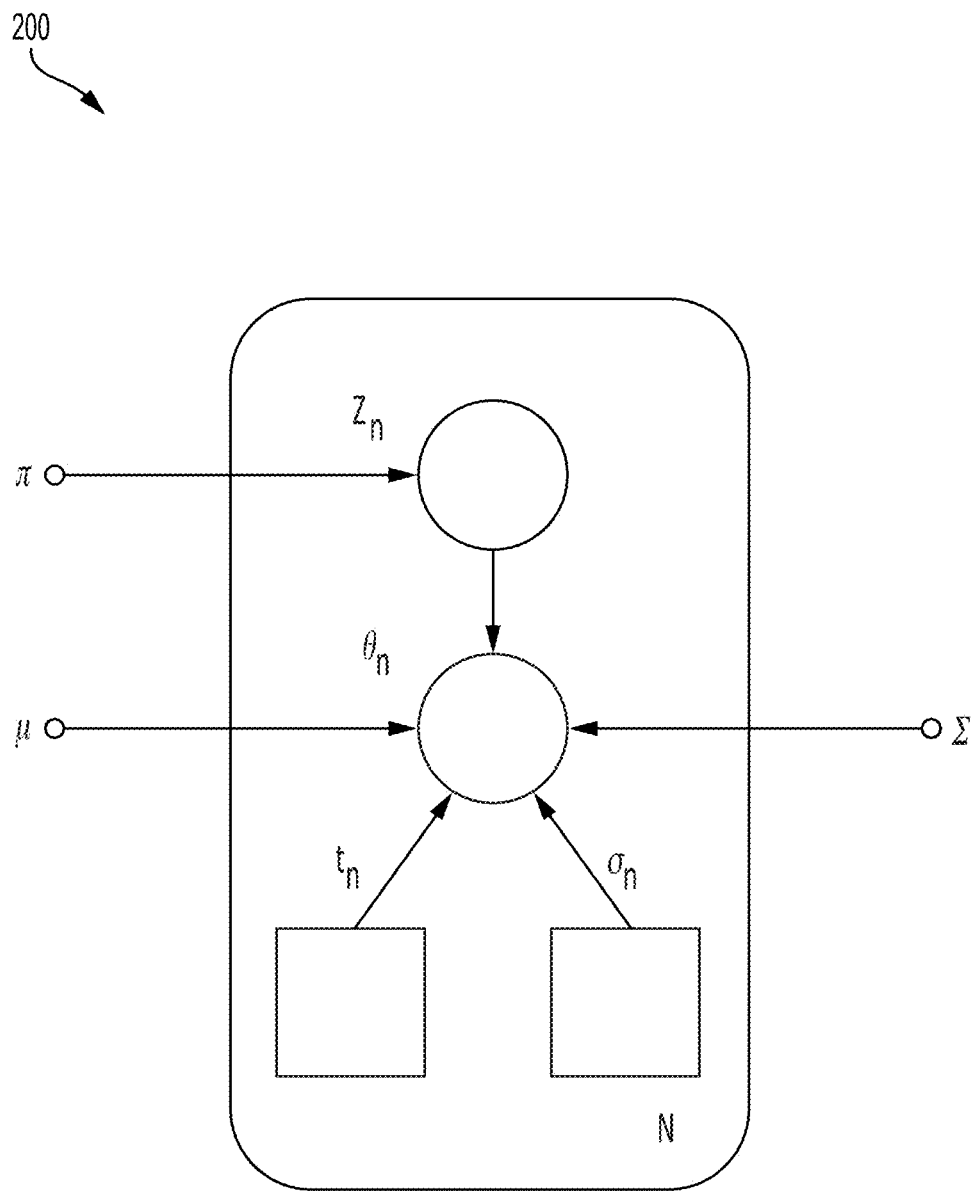
FIG. 2 is a block diagram illustrating a Gaussian mixture of invariants, in accordance with aspects of the present disclosure.

FIG. 2 is a block diagram illustrating a Gaussian mixture 200 of invariants, in accordance with aspects of the present disclosure. Referring to FIG. 2, the Gaussian mixture 200 includes a measurement $\theta_n$ for detected objects. For each measurement $\theta_n$ observed at time $t_n$, latent variables $z_n$, and points, $\pi$, $\mu$, and $\Sigma$ may be estimated as deterministic parameters. The measurement $\theta_n$ is observed from mean of parameters track invariants, $\mu$, invariant covariances, $\Sigma$, and the marginal probability any measurement is from a particular track, $\pi$, through the latent variable $z_n$, which selects the particular track a measurement is from. The expected value of the vector $z_n$ may be estimated based on the posterior probability $\omega_{nk}$. The plate indicates N repeated measurements of $\theta_n$ are made.

The log-likelihood of a given set of π, μ, Σ, representing a set of objects in particular dynamic paths, with parameterized uncertainty, may be given by:

$$\ln p(\theta | t, \sigma, \pi, \mu, \Sigma) = \sum_{n=1}^{N} \ln \left\{ \sum_{k=1}^{K} \pi_k p(\theta_n | t_n, \sigma_n, \vec{\mu}_k, \Sigma_k) \right\} \quad (1)$$

where $\sigma_n$ is the measurement uncertainty for each measurement $\theta_n$.

That is, the joint probability of the measurements may be expressed as the product of the individual probability of each measurement θ (indexed by n), given that nth measurement θ comes from track k, which is described by dynamic invariants drawn from a Gaussian distribution with mean $\vec{\mu}_k$ and covariance $\Sigma_k$. Each individual measurement probability may be weighted by the likelihood of the nth measurement ($\theta_n$) coming from a particular track (k), that is its marginal probability $\pi_k$.

A maximum likelihood estimate of parameters of Equation 1 may be calculated using the approximate E-M algorithm. In some aspects, the E-M algorithm may be seeded with a set of candidate tracks or an initial guess as to the association of measurements to tracks.

Figure 3A:
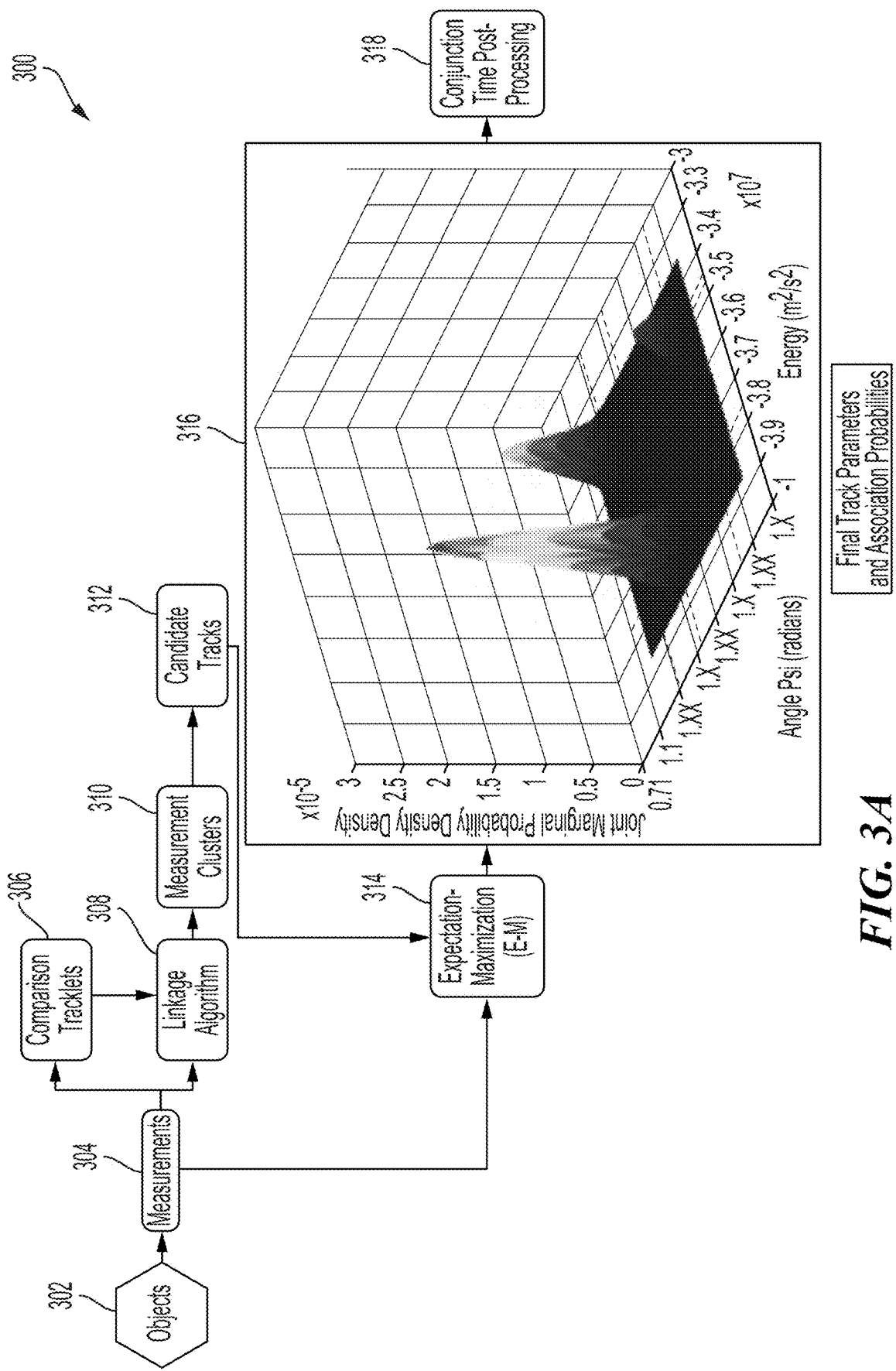
FIG. 3A is a block diagram illustrating example architecture for simultaneously tracking multiple objects, in accordance with aspects of the present disclosure.

FIG. 3A is a block diagram illustrating an example architecture 300 for simultaneously tracking multiple objects, in accordance with aspects of the present disclosure. Referring to FIG. 3A, one or more objects 302 may be detected. The architecture 300 may collect a set of unlabeled measurements 304. The measurements 304 may, for instance, include range, elevation, azimuth, and radial velocity. In some aspects, the measurements 304 may be fused from multiple sensors, including sets of sensors that each provide a different set of measurement types. The measurements 304 may be supplied to a tracklet module 306 and a linkage algorithm 308. The tracklet module 306 may be used to generate candidate tracks. Candidate tracks may be generated by finding which measurements 304 are most likely to be associated with each other. In doing so, candidate tracklets may be generated by randomly selecting a minimum number of measurements (e.g., three measurements). The candidate tracklets may serve as comparison points for grouping the measurements 304. For instance, measurements 304 may be considered close and may be grouped if their set of distances to the candidate tracks are similar.

The linkage algorithm 308 groups the measurements into measurement clusters 310. A preference vector of each measurement 304 for each of the tracklets may be determined. The preferences may be considered a continuous generalization of whether a point is consistent with a tracklet, where each point has a value that lies on the interval [0, 1] to indicate its closeness with the tracklet. The preferences may be calculated as the normalized residual between the measurement 304 and the tracklet at the time each measurement 304 was taken. A scaled exponential of that residual may be taken, and values below a threshold may be set to 0 to produce a vector, $\vec{x}_n$ of preferences. This preference vector, containing the measurement's closeness to (or preference for) each of the candidate tracklets, may serve as a description of the measurement 304.

The measurements 304 may then be clustered (e.g., 310) with other measurements 304 having similar preference vectors n. For instance, preference vectors n having the greatest similarity may be identified. The similarity of the preference vectors n may be computed according to a distance metric. In one, non-limiting example, the distance metric may be given by:

$$d(\vec{x}_i, \vec{x}_j) = \frac{\vec{x}_i \cdot \vec{x}_j}{\vec{x}_i \cdot \vec{x}_i + \vec{x}_j \cdot \vec{x}_j - \vec{x}_i \cdot \vec{x}_j} \quad (2)$$

In some aspects, a similarity threshold may also be applied to reduce the likelihood of combining of tracks for multiple objects (e.g., 302). The preference vectors having the smallest distance within the similarity threshold may be grouped or clustered (e.g., 310). The process may be repeated until either all measurements 304 are merged into a single cluster or all clusters' preference vectors are sufficiently distant from each other.

Notably, the calculation of the distances between each preference vector has cost of $O(K*M^2)$, which is significantly less than the conventional approaches.

The measurement clusters 310 are used to generate a set of candidate tracks 312. In some aspects, the candidate tracks may be received from a previous output of KISMET, via an output of another sensor or tracking technique, via an external source, or may be formed from randomly generated initial track information. The candidate tracks 312 are supplied to the expectation maximization (E-M) module 314. The E-M module 314 may correct the track descriptions and determine association probabilities. For example, the E-M module 314 may merge or discard candidate tracks 312. The E-M module 314 may generate an output 316 indicating updated track parameters and association probabilities of the track to measurements 304 associated with objects 302. In some aspects, a post-processing module 318 may further evaluate the measurement to track association information to identify genealogy or evolution of objects or perform other post-processing tasks, for example.

Figure 3B:
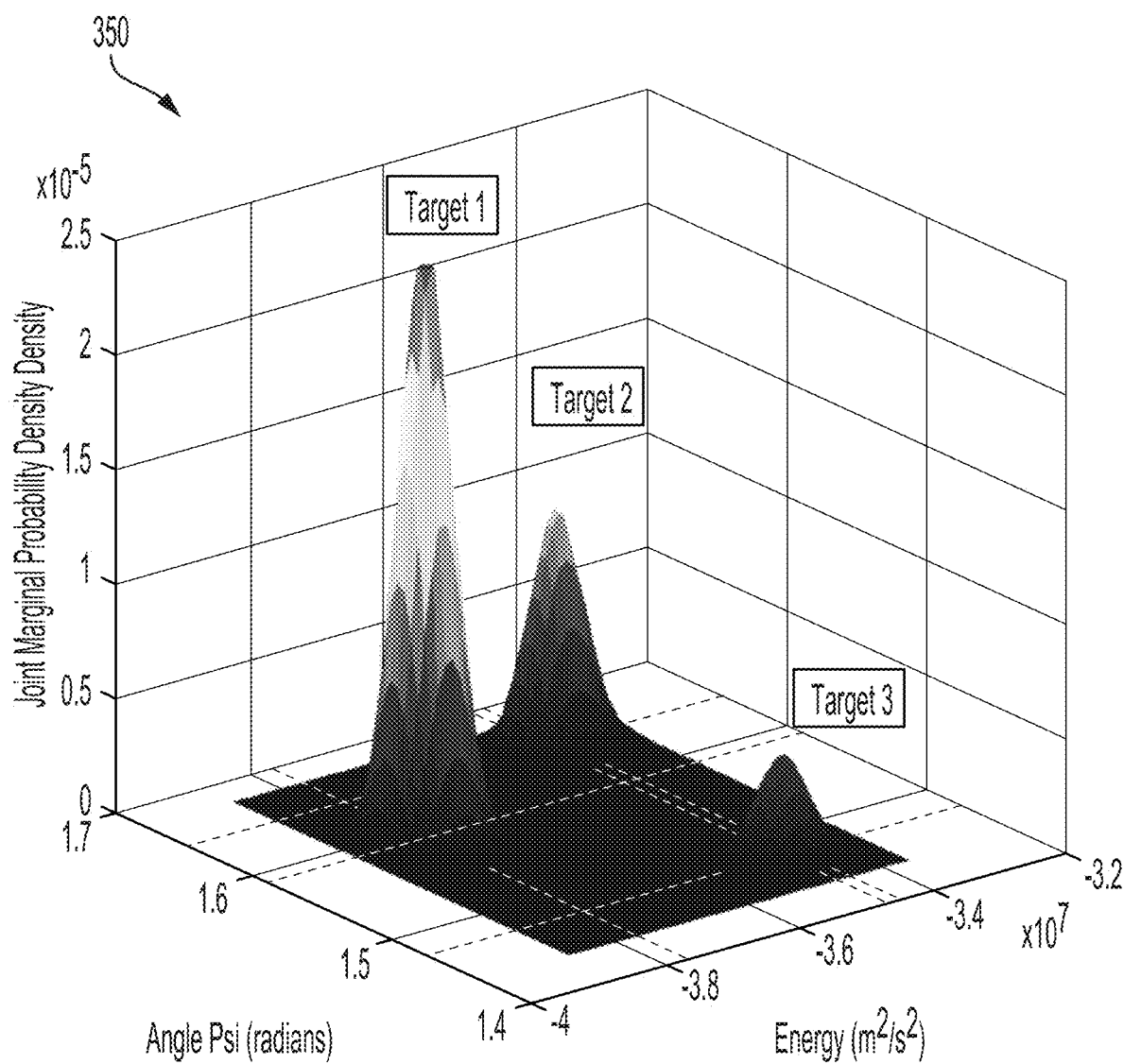
FIG. 3B is a graph illustrating an example output indicating association of tracks to multiple objects, in accordance with aspects of the present disclosure.

FIG. 3B is a graph illustrating an example output 350 indicating association of tracks to an object, in accordance with aspects of the present disclosure. As shown in FIG. 3B, measurements (e.g., angle Psi and energy) are clustered and assigned to tracks corresponding to three targets (objects) based on the joint probability distribution of track attributes and an assignment of measurements to candidate tracks.

Figure 4:
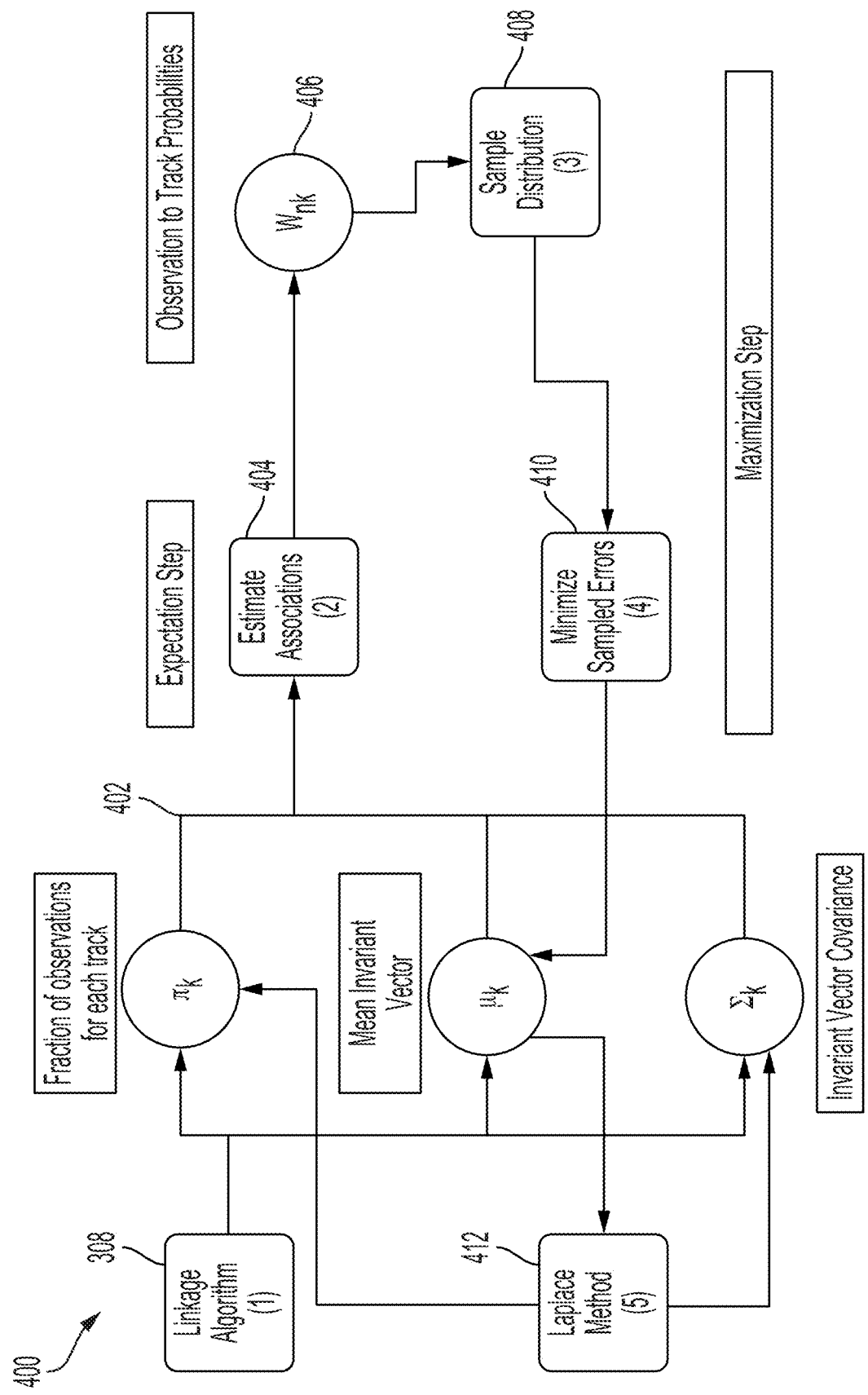
FIG. 4 is a flow diagram of illustrating example process in an Expectation-Maximization (E-M) module, in accordance with aspects of the present disclosure.

FIG. 4 is a flow diagram of illustrating example process 400 in an Expectation-Maximization (E-M) module, in accordance with aspects of the present disclosure. Given K tracks with an initial setting of parameters 402 (e.g., $\pi_k$, $\pi_k$, and $\vec{\mu}_k$), the posterior probability distribution of $z_n$ may be estimated using the initial parameters 402 to estimate associations 404.

The estimated associations 404 generated by the linkage algorithm 308 may then be used to determine the posterior probability distribution $\omega_{nk}$ (406). The posterior probability distribution of $z_n$ may then be used to calculate an expectation. The posterior probability distribution 406 may be a discrete distribution with values (e.g., normalized "weights" of a measurement over the initial components) given by:

$$\omega_{nk} = P(z_n = k | \theta_n, \sigma_n, t_n, \pi_n, \vec{\mu}_k, \Sigma_k). \quad (3)$$

To find the posterior probability distribution $\omega_{nk}$ (406), the likelihood that a single measurement $\theta_n$, $\sigma_n$ comes from a component k, may be evaluated by:

$$p(\theta_n | t_n, \sigma_n, z_n = k) = p(\theta_n | t_n, \sigma_n, \vec{\mu}_k, \Sigma_k). \quad (4)$$

The term on the right side of Equation 4 is the inner term of the likelihood function in Equation 1. Each measurement $\theta_n$ may be a function of the dynamic invariants invariants $\vec{q}_k$, drawn from a distribution parameterized by the mean $\vec{\mu}_k$ and covariance $\Sigma_k$, and a function of the current time $t_n$. That is, the measurement is a function that transforms the higher-dimensional invariant vector, $\vec{q}_k$, into a single valued measurement, $\theta_n$. An unscented transform (UT) may approximate a normally-distributed prediction $\hat{\theta}_{nk}$, $\hat{\sigma}_{nk}$ from $t_n$, $\vec{\mu}_k$, $\Sigma_k$. The UT may efficiently estimate the first and second moments of a distribution under a nonlinear transformation. For example, in six dimensions, the UT may estimate the first and second moments with 13 evaluations of the measurement function (e.g., 13 specific values for the dynamic invariants). As described, measurement functions that are measurable using known sensor platforms include range, azimuth, elevation, and Doppler velocity, for example. However, other measurement functions may also be used. The malleability of the measurement function, and the use of the unscented transform enable moving from the dynamic invariants to the measurements within the Gaussian mixture model. As such, multiple sensors and measurement types may be used to form a combined estimate of the number of object tracks and the invariants describing each object track.

To evaluate the left side of Equation 4, the likelihood of a single measurement may be given by:

$$p(\theta_n | t_n, \sigma_n, z_n = k) = N(\theta_n; \hat{\theta}_{nk}, \sqrt{\sigma_n^2 + \hat{\sigma}_{nk}^2}). \quad (5)$$

where N(x; m, s) is a function defined as the probability of getting the value x from a Gaussian (Normal) distribution with the mean m and the variance s.

Applying Bayes' rule result in:

$$\omega_{nk} = P(z_n = k | \theta_n, \sigma_n, t_n, \pi_{kr}, \vec{\mu}_k, \Sigma_k) \quad (6)$$

$$= \frac{p(\theta_n | t_n, \sigma_n, z_n = k) p(z_n = k)}{\sum_{i=1}^{K} p(\theta_n | t_n, \sigma_n, z_n = i) p(z_n = i)} \quad (7)$$

$$= \frac{p(\theta_n | t_n, \sigma_n, z_n = k) \pi_k}{\sum_{i=1}^{K} p(\theta_n | t_n, \sigma_n, z_n = i) \pi_i} \quad (8)$$

Additional measurement information or knowledge may be used to eliminate the possibility of non-zero values for some of the $\omega_{nk}$. For example, such knowledge may come from physical knowledge, such as measured radar cross-sections. In another example, the additional information or knowledge may be excluded time windows, where some tracks have been determined not to exist at certain times based on previous iterations of the process and/or application of physics. In this example, the excluded values of the posterior probability distribution $\omega_{nk}$ are set to zero, by setting the value of $p(\theta_n | t_n, \sigma_n, z_n = k)$ to zero for the identified n, k pairs.

The maximization uses the computed posterior probability distribution $\omega_{nk}$ from the expectation step. In turn, the marginal probability $\pi_k$, the mean of the dynamic invariants $\vec{\mu}_k$, and the covariance $\Sigma_k$ may be updated based on the posterior probability distribution $\omega_{nk}$. Rather than maximize the log-likelihood in Equation 1, the expectation of the complete log-likelihood under the $\omega_{nk}$ may be maximized with respect to $\pi_k$, $\vec{\mu}_k$, and $\Sigma_k$ as follows:

$$\operatorname{argmin} \sum_{n=1}^{N} \sum_{k=1}^{K} \omega_{nk} \ln \{ p(\theta_n | t_n, \sigma_n, \vec{\mu}_k, \Sigma_k) \pi_k \} \quad (9)$$

The posterior probability distribution $\omega_{nk}$ may be stochastically sampled in a sample distribution module 408 to provide an assignment of measurements to tracks. That is, a stochastic approach may be applied by sampling $\tilde{z}_n$ from Categorical ($\omega_n$), where $\omega_n$ is a vector with elements $\omega_{n1}$ through $\omega_{nk}$, such that optimizing $\vec{\mu}_k$, $\Sigma_k$ over the entire dataset is not performed. Each sampled $\tilde{z}_n$ may be represented by a vector of length K, where $\tilde{z}_{nk}=1$ for exactly one value of k, and is 0 otherwise.

The mean dynamic invariants may be updated via the minimize sampled error module 410. For example, the mean dynamic invariants $\vec{\mu}_k$ may be updated to minimize the residual between the sampled data (e.g., 408) and the measurements. The maximum likelihood estimate of $\vec{\mu}_k$, given the log-likelihood, may be approximated as follows:

$$\ln(\theta, \sigma | t, \vec{\mu}_k) \approx \sum_{n=1}^{N} \tilde{z}_{nk} \ln p(\theta_n | t_n, \sigma_n, \vec{\mu}_k) \quad (10)$$

Writing Equation 10 as a minimization problem yields:

$$\operatorname{argmin}_{\vec{\mu}_k} \sum_{n=1}^{N} \tilde{z}_{nk} \left( \frac{1}{2} (\theta_n - \hat{\theta}_{nk})^T \sigma_n^{-2} (\theta_n - \hat{\theta}_{nk}) \right) \quad (11)$$

Equation 11 is a nonlinear least-squares problem, which may be solved for the best value of mean dynamic invariants $\vec{\mu}_k$, for example, via the Levenberg-Marquardt algorithm. The covariance $\Sigma_k$ may be estimated using a Laplace approximation in module 412. Accordingly, evaluated at point q for the set S {n|$\tilde{z}_{nk}$=1} with constant C, the log-posterior distribution becomes:

$$P(q) = \ln p(q | \theta_s, t_s, \sigma_s) = \ln p(\theta | t_s, \sigma_s, q) + C, \quad (12)$$

The application of the Laplace approximation (e.g., in module 412) produces a Gaussian approximation of the posterior distribution, where the covariance $\Sigma_k$ is given by:

$$\Sigma_k = H^{-1}(P) | \vec{\mu}_k, \quad (13)$$

where H is the Hessian. In some aspects, the covariance $\Sigma_k$ may be projected onto space positive semi-definite (PSD) matrices to ensure it represents a valid covariance.

Having updated the $\vec{\mu}_k$ and $\Sigma_k$, the marginal probability $\pi_k$ is considered. Maximizing part of Equation 9, results in:

$$\sum_{n=1}^{N} \sum_{k=1}^{K} \omega_{nk} \ln \pi_k. \quad (14)$$

Thus, the marginal probability $i_k$ or likelihood of the nth measurement ($\theta_n$) coming from a particular track (k) may be given by:

$$\pi_k = \frac{1}{N} \sum_{n=1}^{N} \omega_{nk}, \qquad (13)$$

In some aspects, the expectation and maximization steps may be alternately repeated until the difference in log-likelihood between iterations falls below a specified threshold.

FIG. 5 is a block of example pseudocode 500 for an E-M process, in accordance with aspects of the present disclosure.

In some aspects, post-processing may be performed to interpret the measurement-to-track association information together with the invariants of motion. For example, the post-processing may include:

1. Identification of excluded time windows for individual tracks, indicating the beginning or ending of the physical existence of certain objects;
2. Use of physical conservation laws to identify the genealogy or evolution of objects corresponding to collisions, separations, or accretion of objects; or
3. Use of physical conservation laws to identify the existence of unobserved objects.

Identifying the time range for each track and tracing their positions using the dynamics described by the invariants of each track may produce a history of the evolution of the group of objects being tracked. This history may, for example, include a first and last time measurement for each object, times at which each object trajectory passes closest to each other object, distance of closest approach between each object pair, and/or other historical information.

Object genealogy may also be evaluated. For instance, objects that do not overlap in their measurement times, and have a time of closest approach in between the end of one object's measurement window and the start of the second object's window, may represent an evolution from one object to the next. The set of these evolutions describes the genealogy of the objects. The genealogy may then be analyzed to understand the nature and classification of various objects within the group. This may reveal the timing of important events in the group of objects and, by associating this with domain knowledge of the expected object evolution, may help identify which track belongs to a particularly important element.

Figure 6:
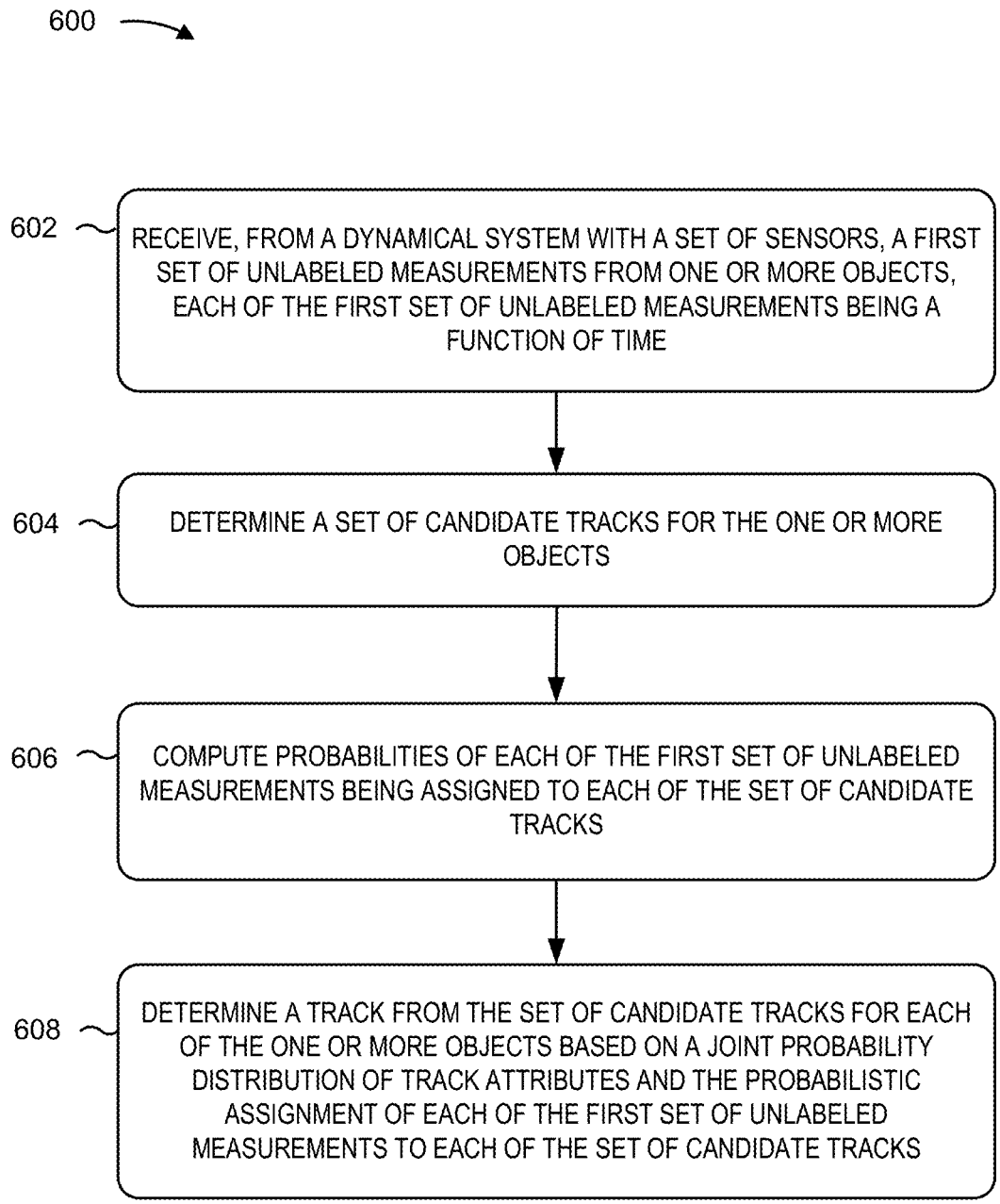
FIG. 6 is a flow diagram illustrating a method for simultaneously tracking multiple objects, in accordance with aspects of the present disclosure.

FIG. 6 is a flow diagram illustrating a method 600 for simultaneously tracking multiple objects, in accordance with aspects of the present disclosure. As shown in FIG. 6, at block 602, the method 600 receives, via a dynamical system with a set of sensors, a first set of unlabeled measurements from one or more objects. Each of the first set of unlabeled measurements is a function of time. As described, for example with reference to FIG. 3A, one or more objects 302 may be detected. The architecture 300 may collect a set of unlabeled measurements 304. The measurements 304 may, for instance, include range, elevation, azimuth, and radial velocity. Each of the measurements may be function of dynamic invariants. In some aspects, the measurements 304 may be fused from multiple sensors, including sets of sensors that each provide a different set of measurement types. I At block 604, the method 600 determines a set of candidate tracks for the multiple objects. As described, for instance, with reference to FIG. 3A, candidate tracks may be generated by finding which measurements 304 are most likely to be associated with each other. In doing so, candidate tracklets may be generated by randomly selecting a minimum number of measurements (e.g., three measurements). The candidate tracklets may serve as comparison points for grouping the measurements 304. For instance, measurements 304 may be considered close and may be grouped if their set of distances to the candidate tracks are similar. A linkage algorithm 308 groups the measurements into measurement clusters 310, which may be used to form the candidate tracks.

At block 606, the method 600 computes probabilities of each of the first set of unlabeled measurements being assigned to each of the set of candidate tracks. As described with reference to FIG. 4, the estimated associations 404 generated by the linkage algorithm 308 may then be used to determine the posterior probability distribution $\omega_k$ (406).

At block 608, the method 600 determines a track from the set of candidate tracks for each of the one or more objects based on a joint probability distribution of track attributes and the probabilistic assignment of each of the first set of unlabeled measurements to each of the set of candidate tracks. As described with reference to FIG. 4, the marginal probability $\pi_k$ or likelihood of the nth measurement ($\theta_n$) coming from a particular track (k) may be computed based on the determined posterior probability distribution $\omega_k$ (406) and may be used to assign a track to each of the objects.

Implementation examples are provided in the following numbered clauses:

1. A processor-implemented method for tracking objects, the method comprising:

receiving, from a dynamical system with a set of sensors, a first set of unlabeled measurements from one or more objects, each of the first set of unlabeled measurements being a function of time;

determining a set of candidate tracks for the one or more objects;

computing probabilities of each of the first set of unlabeled measurements being assigned to each of the set of candidate tracks; and determining a track from the set of candidate tracks for each of the one or more objects based on a joint probability distribution of track attributes and the probabilistic assignment of each of the first set of unlabeled measurements to each of the set of candidate tracks.

2. The processor-implemented method of clause 1, further comprising determining a preference of each unlabeled measurement of the first set of unlabeled measurements for each candidate track of the set of candidate tracks.

3. The processor-implemented method of clause 1 or 2, further comprising computing the preference of each unlabeled measurement of the first set of unlabeled measurements for each candidate track of the set of candidate tracks based on a normalized residual between each unlabeled measurement of the first set of unlabeled measurements and each candidate track of the set of candidate tracks at a time of each measurement.

4. The processor-implemented method of any of clauses 1-3, further comprising identifying one or more clusters of measurements based on a similarity threshold.

5. The processor-implemented method of any of clauses 1-4, in which each of the first set of unlabeled measurements is a function of dynamic invariants.

6. The processor-implemented method of any of clauses 1-5, further comprising assigning each of the first set of unlabeled measurements to one of the set of candidate tracks based on a stochastic sampling of the computed probabilities.

7. The processor-implemented method of any of clauses 1-6, in which one or more of the first set of unlabeled measurements are fused from multiple sensors of the set of sensors.

8. The processor-implemented method of any of clauses 1-7, in which one or more of a position or an orientation of one or more sensors of the set of sensors is changing relative to the one or more objects.

9. The processor-implemented method of any of clauses 1-8, further comprising: receiving a history of measurement information; and updating the track for each of the one or more objects based on the history of measurement information.

10. The processor-implemented method of any of clauses 1-9, further comprising:

receiving a second set of unlabeled measurements from the one or more objects; and generating an inference for genealogy of one of the one or more objects based on the first set of unlabeled measurements and the second set of unlabeled measurements.

11. An apparatus for tracking objects comprising:

a memory; and at least one processor coupled to the memory, the at least one processor configured:

to receive, from a dynamical system with a set of sensors, a first set of unlabeled measurements from one or more objects, each of the first set of unlabeled measurements being a function of time;

to determine a set of candidate tracks for the one or more objects;

to compute probabilities of each of the first set of unlabeled measurements being assigned to each of the set of candidate tracks; and to determine a track from the set of candidate tracks for each of the one or more objects based on a joint probability distribution of track attributes and the probabilistic assignment of each of the first set of unlabeled measurements to each of the set of candidate tracks.

12. The apparatus of clause 11, in which the at least one processor is further configured to determine a preference of each unlabeled measurement of the first set of unlabeled measurements for each candidate track of the set of candidate tracks.

13. The apparatus of clause 11 or 12, in which the at least one processor is further configured to compute the preference of each unlabeled measurement of the first set of unlabeled measurements for each candidate track of the set of candidate tracks based on a normalized residual between each unlabeled measurement of the first set of unlabeled measurements and each candidate track of the set of candidate tracks at a time of each measurement.

14. The apparatus of any of clauses 11-13, in which the at least one processor is further configured to identify one or more clusters of measurements based on a similarity threshold.

15. The apparatus of any of clauses 11-14, in which each of the first set of unlabeled measurements is a function of dynamic invariants.

16. The apparatus of any of clauses 11-15, in which the at least one processor is further configured to assign each of the first set of unlabeled measurements to one of the set of candidate tracks based on a stochastic sampling of the computed probabilities.

17. The apparatus of any of clauses 11-16, in which one or more of the first set of unlabeled measurements are fused from multiple sensors of the set of sensors.

18. The apparatus of any of clauses 11-17, in which one or more of a position or an orientation of one or more sensors of the set of sensors is changing relative to the one or more objects.

19. The apparatus of any of clauses 11-18, in which the at least one processor is further configured:

to receive a history of measurement information; and to update the track for each of the one or more objects based on the history of measurement information.

20. The apparatus of any of clauses 11-19, in which the at least one processor is further configured:

to receive a second set of unlabeled measurements from the one or more objects; and to generate an inference for genealogy of one of the one or more objects based on the first set of unlabeled measurements and the second set of unlabeled measurements.

In one aspect, the detecting means, means for determining a set of candidate tracks, computing means and/or the means for determining a track from the set of candidate tracks for each of the multiple objects may be the CPU 102, program memory associated with the CPU 102, the dedicated memory block 118, and/or the sensor processors 114, configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for tracking objects, the processor-implemented method being performed by at least one processor and comprising:
   receiving, from a dynamical system with a first set of sensors, a first set of unlabeled measurements for one or more objects in motion for at least a portion of an observation period, each of the first set of unlabeled measurements being a function of time;
   determining a set of candidate tracks for the one or more objects by identifying one or more clusters of unlabeled measurements of the first set of unlabeled measurements;
   computing probabilities of each of the first set of unlabeled measurements being assigned to each of the set of candidate tracks;
   determining an assignment of a candidate track from the set of candidate tracks for each of the one or more objects based on a joint probability distribution of track attributes and the computed probabilities of each of the first set of unlabeled measurements being assigned to each of the set of candidate tracks; and
   tracking a position of the one or more objects, using a second set of sensors, subsequent to the observation period based at least in part on the assignment of the candidate track for each of the one or more objects.

2. The processor-implemented method of claim 1, further comprising determining a preference of each unlabeled measurement of the first set of unlabeled measurements for each candidate track of the set of candidate tracks.

3. The processor-implemented method of claim 2, further comprising computing the preference of each unlabeled measurement of the first set of unlabeled measurements for each candidate track of the set of candidate tracks based on a normalized residual between each unlabeled measurement of the first set of unlabeled measurements and each candidate track of the set of candidate tracks at a time of the each unlabeled measurement.

4. The processor-implemented method of claim 1, further comprising identifying the one or more clusters of measurements based on a similarity threshold.

5. The processor-implemented method of claim 1, in which each of the first set of unlabeled measurements is a function of dynamic invariants.

6. The processor-implemented method of claim 1, further comprising determining the assignment of each of the first set of unlabeled measurements to one of the set of candidate tracks based on a stochastic sampling of the computed probabilities.

7. The processor-implemented method of claim 1, in which one or more of the first set of unlabeled measurements are fused from multiple sensors of the first set of sensors.

8. The processor-implemented method of claim 1, in which one or more of a position or an orientation of one or more sensors of the first set of sensors is changing relative to the one or more objects.

9. The processor-implemented method of claim 1, further comprising:
   receiving a history of measurement information; and
   updating the assignment of the candidate track for each of the one or more objects based on the history of measurement information.

10. The processor-implemented method of claim 1, further comprising:
    receiving a second set of unlabeled measurements from the one or more objects; and
    generating an inference for genealogy of one of the one or more objects based on the first set of unlabeled measurements and the second set of unlabeled measurements.

11. An apparatus for tracking objects comprising:
    at least one memory; and
    at least one processor coupled to the at least one memory, the at least one processor configured:
    to receive, from a dynamical system with a first set of sensors, a first set of unlabeled measurements for one or more objects in motion for at least a portion of an observation period, each of the first set of unlabeled measurements being a function of time;

to determine a set of candidate tracks for the one or more objects by identifying one or more clusters of unlabeled measurements of the first set of unlabeled measurements;

to compute probabilities of each of the first set of unlabeled measurements being assigned to each of the set of candidate tracks;

to determine an assignment of a candidate track from the set of candidate tracks for each of the one or more objects based on a joint probability distribution of track attributes and the computed probabilities of each of the first set of unlabeled measurements being assigned to each of the set of candidate tracks; and to track a position of the one or more objects, using a second set of sensors, subsequent to the observation period based at least in part on the assignment of the candidate track for each of the one or more objects.

12. The apparatus of claim 11, in which the at least one processor is further configured to determine a preference of each unlabeled measurement of the first set of unlabeled measurements for each candidate track of the set of candidate tracks.

13. The apparatus of claim 12, in which the at least one processor is further configured to compute the preference of each unlabeled measurement of the first set of unlabeled measurements for each candidate track of the set of candidate tracks based on a normalized residual between each unlabeled measurement of the first set of unlabeled measurements and each candidate track of the set of candidate tracks at a time of the each unlabeled measurement.

14. The apparatus of claim 11, in which the at least one processor is further configured to identify the one or more clusters of measurements based on a similarity threshold.

15. The apparatus of claim 11, in which each of the first set of unlabeled measurements is a function of dynamic invariants.

16. The apparatus of claim 11, in which the at least one processor is further configured to determine the assignment of each of the first set of unlabeled measurements to one of the set of candidate tracks based on a stochastic sampling of the computed probabilities.

17. The apparatus of claim 11, in which one or more of the first set of unlabeled measurements are fused from multiple sensors of the first set of sensors.

18. The apparatus of claim 11, in which one or more of a position or an orientation of one or more sensors of the first set of sensors is changing relative to the one or more objects.

19. The apparatus of claim 11, in which the at least one processor is further configured:

to receive a history of measurement information; and to update the assignment of the candidate track for each of the one or more objects based on the history of measurement information.

20. The apparatus of claim 11, in which the at least one processor is further configured:

to receive a second set of unlabeled measurements from the one or more objects; and to generate an inference for genealogy of one of the one or more objects based on the first set of unlabeled measurements and the second set of unlabeled measurements.

* * * * *